(12) United States Patent
Villano et al.

(10) Patent No.: US 6,773,038 B2
(45) Date of Patent: Aug. 10, 2004

(54) DUCT FOR FEEDING A FLUID AT HIGH PRESSURE

(75) Inventors: Antonio Villano, Baldissero Torinese (IT); Mariofelice Zanardi, Turin (IT)

(73) Assignee: Dayco Fluid Technologies S.p.A., Turin (IT)

( * ) Notice: Subject to any disclaimer, the term of this patent is extended or adjusted under 35 U.S.C. 154(b) by 0 days.

(21) Appl. No.: 10/265,173

(22) Filed: Oct. 4, 2002

(65) Prior Publication Data

US 2003/0080558 A1 May 1, 2003

(30) Foreign Application Priority Data

Oct. 5, 2001 (IT) ...................................... TO2001A0946

(51) Int. Cl.[7] .............................................. F16L 33/00
(52) U.S. Cl. ..................... 285/256; 285/241; 285/222.4
(58) Field of Search .............................. 285/242, 222.1, 285/222.2, 222.3, 222.4, 256, 241

(56) References Cited

U.S. PATENT DOCUMENTS

| | | | | |
|---|---|---|---|---|
| 2,228,018 A | * | 1/1941 | Scholtes | ................... 285/222.4 |
| 2,685,458 A | * | 8/1954 | Shaw | ...................... 285/222.4 |
| 4,330,142 A | | 5/1982 | Paini | .......................... 285/256 |
| 4,657,285 A | * | 4/1987 | Akiyama et al. | ........... 285/256 |
| 4,671,542 A | * | 6/1987 | Juchnowski | ................. 285/256 |
| 4,684,157 A | * | 8/1987 | Smith | .......................... 285/256 |
| 5,137,309 A | * | 8/1992 | Beagle | ........................ 285/256 |
| 5,553,896 A | * | 9/1996 | Woodward | .................. 285/256 |
| 5,622,394 A | | 4/1997 | Soles et al. | .................. 285/256 |

FOREIGN PATENT DOCUMENTS

| | | | |
|---|---|---|---|
| DE | 9104415 | 8/1991 | |
| DE | 9411779 | 10/1994 | |
| EP | 1122484 A2 | 8/2001 | |
| FR | 2594205 | * 8/1987 | ................. 285/256 |
| JP | 2300594 | * 12/1990 | ................. 285/256 |

* cited by examiner

*Primary Examiner*—David Bochna
(74) *Attorney, Agent, or Firm*—Sheridan Ross PC

(57) ABSTRACT

A hydraulic duct for feeding fluid at high pressure comprising a metal tube, a flexible tube of elastic material and a connector is provided with at least one main projection and a plurality of auxiliary projections, and the main projection is bounded on the side of the flexible tube by a conical surface. The flexible tube is fitted on the connector and is enclosed by an aluminium bell of a profile which can be coupled with the projections of the connector and is adapted to prevent the flexible tube from slipping off and to ensure fluid-tightness. The bell has an end rim which abuts against the conical portion of the main projection which faces towards the flexible tube.

5 Claims, 1 Drawing Sheet

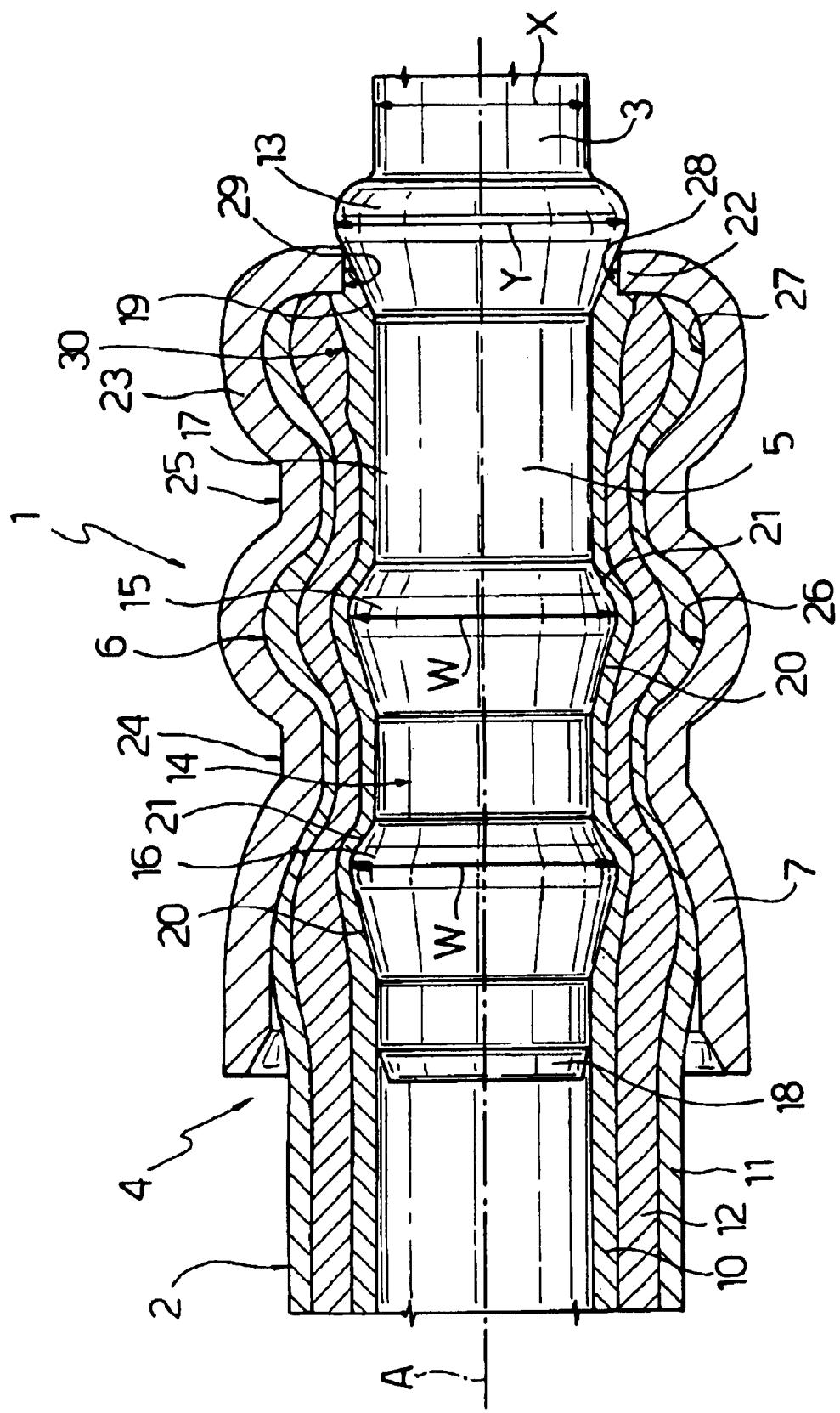

DUCT FOR FEEDING A FLUID AT HIGH PRESSURE

The present invention relates to a duct for feeding a fluid at high pressure and, in particular, to a duct comprising a metal tube, a tube of elastomeric material and a connector assembly for effecting a fluid-tight connection between the two tubes.

The invention is applied, preferably but not exclusively, to power-assisted steering installations in motor vehicles, to which the following description will refer without thereby implying any restriction.

BACKGROUND OF THE INVENTION

Power-assisted steering installations generally comprise a circuit portion provided with a substantially rigid metal tube and a circuit portion provided with a flexible tube, in particular a tube of reinforced elastomeric material.

However, the problem arises of connecting the two types of tube while effecting a good seal under conditions of high pressure and with pulsating flow.

For this purpose there are generally used connecting assemblies comprising a tubular connector which is rigidly fixed, for example welded, or integral with the metal tube and provided with a plurality of annular projections, on to which is fitted one end of the flexible tube. The connecting assembly further comprises a bell-type clamping element which is plastically deformed to clamp the end of the flexible tube on to the connector, so as to effect a fluid-tight seal and prevent the flexible tube from slipping off axially.

More particularly, the connector may be produced as a self-contained element by machining using a machine tool, for example by turning, or subsequently welded, for example by brazing, to an end portion of the metal tube.

However, the stage of machining by machine tool is very expensive and thus results in the connector having high productions costs.

Furthermore, this solution exhibits the drawbacks which are typical of welding, namely of treating the parts to be welded with polluting substances and the risk of the materials undergoing thermal changes.

Alternatively, the connector may be integral with the metal tube, i.e. formed by plastic deformation of the end of the metal tube on which the flexible tube is directly fitted. This solution has lower costs with respect to the previously described solution and obviates the drawbacks associated with welding but it is still not without problems.

In fact, according to a known embodiment, the connector has a main annular projection adapted to form an axial abutment for the clamping element, and a plurality of secondary projections adapted to co-operate with the flexible tube; the clamping element is deformed radially so as to form grooves interposed between said projections, which compress the flexible tube so as to ensure a fluid-tight seal and prevent it from slipping off axially. Under particularly severe test conditions, and in particular at high pulsating pressure, losses of fluid can occur as a result of leakage between the flexible tube and the connector in the region of the main projection.

SUMMARY OF THE INVENTION

The object of the present invention is to devise a duct for feeding a fluid at high pressure, which does not have the aforementioned drawbacks associated with the known art.

This object is achieved by a duct according to claim 1.

The conical profile of the main projection of the connector provides an additional compression effect of the end section of the tube adjacent the main projection, as a result of which there is achieved a substantial reduction in leakages, even under particularly severe test conditions.

According to a preferred embodiment of the invention, in which the flexible tube has a multilayer structure with an inner layer and an outer layer of elastomeric material and an intermediate reinforcing layer which is impermeable to fluid, the bell-type clamping element comprises an annular stop portion co-operating with the conical flank of the main projection and has an inner diameter which is less than the diameter of the interface surface between the inner layer and the intermediate layer of the flexible tube in the free end section of said tube.

Therefore, leakages towards the exterior are contained, which are caused by the fluid permeating through the inner layer of the flexible tube and by the permeated fluid running along the interface surface up to the end section of said tube.

BRIEF DESCRIPTION OF THE DRAWING

With a view to a better understanding of the present invention a preferred embodiment will be described non-restrictively by way of example below and with reference to the accompanying drawing, which is an axial section of a connector designed in accordance with the present invention.

DETAILED DESCRIPTION OF THE INVENTION

Referring now to the drawing, the reference numeral 1 denotes a connecting assembly for fluid-tightly connecting a flexible tube 2 (partly shown) to a metal tube 3 (also partly shown) forming together a feed duct 4 for a fluid under high pressure, for example for a power-assisted steering installation.

The metal tube 3 with an axis A has an outer diameter x and integrally defines, at one end thereof, a connector 5 forming part of the connecting assembly 1 on which is fitted one end 6 of the flexible tube 2.

The flexible tube 2 comprises an inner layer 10 and an outer layer 11 both consisting of elastomeric material, and an intermediate reinforcing layer 12 which is formed by a braid of polyamide which is impermeable to the fluid circulating in the duct 4.

The connecting assembly 1 further comprises a clamping element 7 which encloses the end 6 of the flexible tube 2 so as to clamp it fluid-tightly on the connector 5, as will be explained in more detail below.

The connector 5 comprises a first portion connected integrally with the metal tube 3 and is formed by a main annular projection 13 having an outer diameter Y which is larger than the diameter X, and by a second portion 14 on which is fitted the flexible tube 2 and having a first auxiliary annular projection 15, and a second auxiliary annular projection 16. The auxiliary projections 15,16 have an outer diameter W which is larger than the diameter X of the metal tube portions 17 interposed between the projections 13,15, 16 and having a diameter equal to the diameter of the metal tube 3, and an end portion 18 provided at the end of the connector 5.

The main projection 13 is of rounded profile and, according to the present invention, is bounded towards the portion 14 by a conical flank 19, the diameter of which decreases towards said portion.

The projections 15 and 16 are of rounded profile and are each bounded axially by a first conical flank 20 and by a second conical flank 21, which face respectively towards the end portion 18 and towards the main projection 13 of the connector 5, and which are respectively of lesser and greater gradient.

The clamping element 7 is bell-shaped and comprises an annular stop portion 22 co-operating axially with the conical flank 19 of the main projection 13 and a tubular portion 23 surrounding the end 6 of the flexible tube 2 and clamped on said end so as to lock the flexible tube 2 fluid-tightly on the second portion 14 of the connector 5.

In particular, the tubular portion 23 is deformed so as to create two grooves 24,25 in alignment with the cylindrical portions 17 in the vicinity of the flanks 21 of the auxiliary projections 15,16 so as to cause a local compression of the flexible tube 2 and prevent it from slipping off axially.

The material forming the flexible tube 2, following said compression, completely occupies the spaces 26,27 which are formed between the connector 5 and the tubular portion 23 of the clamping element 7 and which are bounded axially by the grooves 24,25 and, respectively, by the groove 25 and by the annular stop portion.

In particular, once the deformation of the clamping element 7 has taken place, the space 27 has a smaller volume than the portion of flexible tube 2 accommodated therein before the deformation, so as to "extrude" an inner annular end portion 28 of the flexible tube 2 into the space between the conical flank 19 of the main projection 13 and an inner cylindrical rim 29 of the annular stop portion 22 of the clamping element 7.

Advantageously, said rim 29 is of smaller diameter than the diameter of the interface surface 30 between the inner layer 10 and the intermediate layer 12 in the free end section of the flexible tube 2.

It is evident that the duct 4 and the connecting assembly 1 described can be subject to modifications and variants which do not depart from the scope of protection defined by the claims.

What is claimed is:

1. A fluid-tight connecting assembly between a metal tube and a flexible tube for a hydraulic installation, the assembly comprising a connector having a first portion connected to said metal tube and a second portion over which said flexible tube is fitted, said connector comprising a main annular projection provided on said first portion and a plurality of auxiliary annular projections disposed on said second portion and adapted to co-operate with said flexible tube, said assembly further comprising a bell-type clamping element having an annular stop portion abutting with a conical flank of said main projection and a tubular portion surrounding said flexible tube and compressingly clamped thereon so as to lock said flexible tube fluid-tightly on said second portion of said connector; and wherein said tubular portion is deformed so as to form a plurality of grooves each of which is disposed between a pair of said auxiliary annular projections of said connector, said connector and said clamping element forming between them a space adjacent said annular stop portion and bounded axially by said annular stay portion and by a first one of said grooves, said space having a smaller volume than the portion of flexible tube accommodated in it before the deformation of said clamping element so as to extrude an inner annular end portion of the flexible tube into the space located between said conical flank of said main projection and an inner rim of said annular stop portion of said clamping element, said inner annular end portion thereby being compressed between said conical flank and said inner rim.

2. A duct according to claim 1, characterised in that said connector is integral with said metal tube.

3. A hydraulic duct for feeding a fluid at high pressure comprising a metal tube, a flexible tube and a connecting assembly positioned between said metal tube and said flexible tube, said assembly comprising a connector having a first portion connected to said metal tube and a second portion on which said flexible tube is fitted, said connector comprising a main annular projection provided on said first portion and a plurality of auxiliary annular projections disposed on said second portion and co-operating with said flexible tube, said assembly further comprising a bell-type clamping element mounted over said flexible tube and separated from said metal tube, said clamping element having an annular stop portion abutting with a flank of said main projection and a tubular portion surrounding said flexible tube and compressingly clamped thereon so as to lock said flexible tube fluid-tightly on said second portion of said connector, said flank of said main projection having a conical surface, and tubular portion being deformed when clamped so as to form a plurality of grooves each of which is disposed between a pair of said auxiliary annular projections, said connector and said clamping element forming between them a space adjacent said annular stop portion and bonded axially by said annular stop portion and by a first one of said grooves, said space having a smaller volume than the portion of the flexible tube accommodated in it before the deformation of said clamping element so as to extrude an inner annular end portion of the flexible tube into the space located between said conical flank of said main projection and an inner rim of said annular stop portion of said clamping element, said inner annular end portion thereby being compressed between said conical flank and said inner rim.

4. A duct according to claim 3, characterised in that said flexible tube comprises at least one inner layer and an outer layer made of elastomeric material, and an intermediate reinforcing layer positioned between said inner and outer layer which is impermeable to said fluid.

5. A duct according to claim 4, characterised in that the inner rim of said annular stop portion is of smaller diameter than the diameter of an interface surface between said inner layer and said intermediate layer in an end section of said flexible tube.

* * * * *